| FIG.3a | FIG.3b |

| BISTABLE DEVICE | Σ1 | Σ2 | Σ3 | Σ4 | Σ5 | Σ6 | Σ7 | Σ8 | Σ9 | Σ0 |
|---|---|---|---|---|---|---|---|---|---|---|
| $1^1$ | 2.2 | 3.4 | 2.2 | 2.2 | 2.2 | 2.2 | 7.2 | 2.2 | 2.2 | 2.2 |
| $1^0$ | 3.9 | 2.3 | 5.6 | 9.1 | 3.9 | ∞ | 2.2 | ∞ | ∞ | ∞ |
| $2^1$ | 2.2 | 2.2 | 2.2 | 2.2 | 2.2 | 14.4 | 3.4 | 3.8 | 2.3 | 7.2 |
| $2^0$ | 6.2 | 9.1 | ∞ | ∞ | 9.1 | 2.2 | 2.3 | 2.2 | 3.5 | 2.2 |
| $3^1$ | ∞ | 2.2 | ∞ | 7.2 | 2.2 | 2.2 | ∞ | 2.3 | 2.2 | 2.3 |
| $3^0$ | 2.2 | ∞ | 2.2 | 2.2 | ∞ | ∞ | 2.2 | 3.3 | 4.8 | 3.0 |
| $4^1$ | ∞ | 2.2 | 2.2 | 2.2 | 2.2 | 2.2 | 5.1 | 2.2 | 2.2 | 2.2 |
| $4^0$ | 2.2 | ∞ | 4.2 | 9.1 | 5.6 | 9.1 | 2.2 | ∞ | 4.8 | 4.8 |
| $5^1$ | 14.4 | 2.6 | 2.4 | 2.2 | 3.2 | 3.4 | 2.2 | 2.9 | 2.2 | ∞ |
| $5^0$ | 2.2 | 2.5 | 2.9 | 3.9 | 2.3 | 2.3 | ∞ | 2.4 | 9.1 | 2.2 |
| $6^1$ | 14.4 | 2.2 | 2.2 | 2.2 | 4.0 | 3.0 | ∞ | 2.2 | 2.5 | 2.8 |
| $6^0$ | 2.2 | 3.9 | ∞ | 4.2 | 2.2 | 2.3 | 2.2 | 9.1 | 2.6 | 2.4 |
| $7^1$ | 2.2 | 3.4 | 2.3 | 2.7 | 2.2 | 2.2 | ∞ | 2.5 | 2.2 | 7.2 |
| $7^0$ | ∞ | 2.3 | 3.5 | 2.5 | ∞ | ∞ | 2.2 | 2.7 | 4.8 | 2.2 |
| $8^1$ | 2.3 | 2.2 | 14.4 | 2.2 | 2.2 | 2.2 | ∞ | 2.3 | 3.2 | 3.0 |
| $8^0$ | 3.7 | ∞ | 2.2 | 9.1 | ∞ | ∞ | 2.2 | 3.1 | 2.3 | 2.3 |
| $9^1$ | ∞ | ∞ | ∞ | 2.5 | 4.6 | ∞ | ∞ | 2.2 | 2.3 | 2.2 |
| $9^0$ | 2.2 | 2.2 | 2.2 | 2.7 | 2.2 | 2.2 | 2.2 | ∞ | 3.2 | ∞ |
| $10^1$ | 7.2 | 3.4 | 14.4 | 3.0 | 2.2 | 2.2 | ∞ | 2.2 | 2.2 | 2.2 |
| $10^0$ | 2.2 | 2.3 | 2.2 | 2.3 | ∞ | ∞ | 2.2 | ∞ | ∞ | 9.1 |
| $11^1$ | 2.2 | 2.8 | 2.2 | 2.2 | 7.2 | 4.0 | 4.0 | 2.2 | ∞ | 2.2 |
| $11^0$ | ∞ | 2.4 | 4.6 | 3.9 | 2.2 | 2.2 | 2.2 | 5.6 | ∞ | ∞ |
| $12^1$ | 2.2 | ∞ | 2.5 | 2.2 | ∞ | 5.1 | 2.3 | 2.3 | 2.2 | 2.2 |
| $12^0$ | ∞ | 2.2 | 2.7 | ∞ | 2.2 | 2.2 | 3.3 | 3.0 | 9.1 | 6.2 |
| $13^1$ | ∞ | 5.1 | ∞ | ∞ | 2.2 | 2.2 | ∞ | 2.2 | 2.2 | 2.3 |
| $13^0$ | 2.2 | 2.2 | 2.2 | 2.2 | ∞ | 9.1 | 2.2 | 4.8 | ∞ | 3.2 |
| $14^1$ | ∞ | 3.1 | ∞ | 3.2 | 2.9 | 2.2 | ∞ | 2.2 | ∞ | 2.2 |
| $14^0$ | 2.2 | 2.3 | 2.2 | 2.3 | 2.4 | 4.2 | 2.2 | ∞ | 2.2 | 3.9 |
| $15^1$ | ∞ | 2.2 | 2.2 | 2.2 | 2.2 | 2.5 | 3.0 | 2.2 | 2.2 | 14.4 |
| $15^0$ | 2.2 | 4.8 | 5.6 | ∞ | ∞ | 2.7 | 2.3 | ∞ | ∞ | 2.2 |
| $16^1$ | 3.8 | 2.4 | 2.2 | 2.2 | 5.1 | 2.2 | 14.4 | 2.2 | 2.2 | 2.6 |
| $16^0$ | 2.2 | 2.9 | ∞ | ∞ | 2.2 | ∞ | 2.2 | 9.1 | ∞ | 2.5 |
| $17^1$ | 2.2 | ∞ | ∞ | 2.2 | ∞ | 14.4 | ∞ | 3.8 | 14.4 | ∞ |
| $17^0$ | ∞ | 2.2 | 2.2 | 9.1 | 2.2 | 2.2 | 2.2 | 2.2 | 2.2 | 2.2 |
| $18^1$ | ∞ | ∞ | ∞ | 2.2 | ∞ | 14.4 | ∞ | ∞ | 14.4 | ∞ |
| $18^0$ | 2.2 | 2.2 | 2.2 | 5.6 | 2.2 | 2.2 | 2.2 | 2.2 | 2.2 | 2.2 |
| $19^1$ | ∞ | 2.4 | 2.2 | 3.2 | 2.2 | 2.5 | ∞ | 2.2 | 2.7 | 2.2 |
| $19^0$ | 2.2 | 2.9 | 3.8 | 2.3 | 5.6 | 2.7 | 2.2 | 5.6 | 2.5 | 6.2 |
| $20^1$ | ∞ | ∞ | ∞ | 3.2 | 2.5 | 2.3 | ∞ | 2.2 | ∞ | ∞ |
| $20^0$ | 2.2 | 2.2 | 2.2 | 2.3 | 2.7 | 3.2 | 2.2 | 5.6 | 2.2 | 2.2 |

| | | | | | | | | | | |
|---|---|---|---|---|---|---|---|---|---|---|
| $21^1$ | ∞ | ∞ | 4.3 | ∞ | 5.1 | 2.3 | ∞ | 2.2 | 2.3 | 2.2 |
| $21^0$ | 2.2 | 2.2 | 2.2 | 2.2 | 2.2 | 3.6 | 2.2 | ∞ | 3.5 | 9.1 |
| $22^1$ | ∞ | ∞ | 3.0 | 4.0 | 2.2 | 2.2 | ∞ | 2.2 | 2.2 | 5.1 |
| $22^0$ | 2.2 | 2.2 | 2.3 | 2.2 | ∞ | ∞ | 2.2 | ∞ | 4.2 | 2.2 |
| $23^1$ | ∞ | 3.0 | ∞ | 2.5 | 4.6 | 2.2 | ∞ | 2.2 | 2.2 | 2.2 |
| $23^0$ | 2.2 | 2.3 | 2.2 | 2.7 | 2.2 | 4.8 | 2.2 | 4.2 | ∞ | 9.1 |
| $24^1$ | ∞ | 2.3 | ∞ | 2.2 | 2.2 | 2.2 | 3.4 | 2.2 | 2.3 | 2.2 |
| $24^0$ | 2.2 | 3.0 | 2.2 | 3.9 | ∞ | 5.6 | 2.3 | 9.1 | 3.6 | 9.1 |
| $25^1$ | ∞ | 14.4 | 2.4 | 2.3 | 2.2 | 2.4 | ∞ | 2.2 | ∞ | 2.2 |
| $25^0$ | 2.2 | 2.2 | 2.8 | 3.3 | 9.1 | 2.9 | 2.2 | 9.1 | ∞ | ∞ |
| $26^1$ | 3.1 | 2.2 | 2.4 | 5.1 | 2.2 | 3.5 | 2.2 | 2.7 | 2.2 | ∞ |
| $26^0$ | 2.3 | ∞ | 2.7 | 2.2 | ∞ | 2.3 | ∞ | 2.5 | ∞ | 2.2 |
| $27^1$ | ∞ | 7.2 | 2.2 | 5.1 | 2.2 | 2.2 | ∞ | 2.2 | 2.8 | 3.4 |
| $27^0$ | 2.2 | 2.2 | 4.2 | 2.2 | 3.9 | ∞ | 2.2 | 9.1 | 2.4 | 2.3 |
| $28^1$ | ∞ | 2.2 | 14.4 | 3.4 | 7.2 | 2.4 | ∞ | 2.2 | 2.2 | 2.2 |
| $28^0$ | 2.2 | ∞ | 2.2 | 2.3 | 2.2 | 2.9 | 2.2 | 3.9 | 5.6 | ∞ |
| $29^1$ | ∞ | 3.8 | ∞ | 14.4 | 7.2 | 2.6 | 2.2 | 2.2 | ∞ | ∞ |
| $29^0$ | 2.2 | 2.2 | 2.2 | 2.2 | 2.2 | 2.5 | 4.8 | ∞ | 2.2 | 2.2 |
| $30^1$ | ∞ | 2.2 | ∞ | 2.7 | 2.2 | 2.4 | 14.4 | 2.2 | 2.2 | ∞ |
| $30^0$ | 2.2 | ∞ | 2.2 | 2.4 | 5.6 | 2.9 | 2.2 | ∞ | ∞ | 2.2 |
| $31^1$ | ∞ | 2.2 | 2.3 | 14.4 | 2.2 | 2.2 | ∞ | 2.3 | 2.3 | 14.4 |
| $31^0$ | 2.2 | 9.1 | 3.4 | 2.2 | ∞ | ∞ | 2.2 | 3.2 | 3.1 | 2.2 |
| $32^1$ | 5.1 | 2.2 | 14.4 | 2.8 | 2.6 | 2.2 | 2.2 | 2.2 | 2.2 | 2.8 |
| $32^0$ | 2.2 | ∞ | 2.2 | 2.4 | 2.5 | ∞ | ∞ | 3.9 | ∞ | 2.4 |
| $33^1$ | ∞ | ∞ | 14.4 | ∞ | ∞ | ∞ | ∞ | 2.7 | 2.2 | 2.2 |
| $33^0$ | 2.2 | 2.2 | 2.2 | 2.2 | 2.2 | 2.2 | 2.2 | 2.4 | 4.8 | 3.9 |
| $34^1$ | ∞ | 4.6 | 2.2 | 3.1 | 2.4 | 2.2 | 14.4 | 2.2 | 2.2 | ∞ |
| $34^0$ | 2.2 | 2.2 | 4.6 | 2.3 | 2.9 | 4.8 | 2.2 | ∞ | ∞ | 2.2 |
| $35^1$ | 14.4 | ∞ | 2.2 | 2.5 | ∞ | 3.8 | ∞ | 2.2 | ∞ | 5.1 |
| $35^0$ | 2.2 | 2.2 | 9.1 | 2.7 | 2.2 | 2.2 | 2.2 | ∞ | 2.2 | 2.2 |
| $36^1$ | ∞ | 2.2 | ∞ | 2.2 | 2.4 | 2.4 | ∞ | 2.2 | 2.3 | 2.2 |
| $36^0$ | 2.2 | ∞ | 2.2 | 4.8 | 2.9 | 2.9 | 2.2 | ∞ | 3.6 | 3.9 |
| $37^1$ | ∞ | 2.2 | ∞ | 2.3 | 3.2 | 2.2 | ∞ | 2.2 | 7.2 | 7.2 |
| $37^0$ | 2.2 | ∞ | 2.2 | 3.3 | 2.3 | ∞ | 2.2 | 4.2 | 2.2 | 2.2 |
| $38^1$ | 3.1 | 2.2 | 14.4 | 2.3 | 2.2 | 2.2 | ∞ | 2.2 | 3.4 | ∞ |
| $38^0$ | 2.3 | ∞ | 2.2 | 3.3 | ∞ | ∞ | 2.2 | 9.1 | 2.3 | 2.2 |
| $39^1$ | 7.2 | 2.6 | ∞ | 2.8 | ∞ | 2.2 | 2.2 | 3.8 | 2.2 | 2.2 |
| $39^0$ | 2.2 | 2.5 | 2.2 | 2.4 | 2.2 | ∞ | 9.1 | 2.2 | ∞ | ∞ |

FIG. 5b

United States Patent Office 3,196,399
Patented July 20, 1965

3,196,399
SPECIMEN IDENTIFICATION TECHNIQUES EMPLOYING SELECTED FUNCTIONS OF AUTOCORRELATION FUNCTIONS
Louis A. Kamentsky, Briarcliff Manor, and Chao-Ning Liu, Yorktown Heights, N.Y., assignors to International Business Machines Corporation, New York, N.Y., a corporation of New York
Filed Oct. 1, 1962, Ser. No. 227,322
28 Claims. (Cl. 340—146.3)

This invention relates to specimen identification methods and apparatus and, in particular, to methods and apparatus which utilize selected functions of autocorrelation functions for identifying various types of specimens including printed characters and methods of selecting those functions which have a high discriminating ability.

Autocorrelation functions and functions of autocorrelation functions may be used to provide enhanced specimen identifications as shown and described in U.S. patent application Serial Number 45,034, filed on July 25, 1960 by Lawrence P. Horwitz and Glenmore L. Shelton, Jr., entitled Specimen Identification Apparatus and Methods. Among the advantages of using autocorrelation functions and functions of autocorrelation for specimen identification are registration invariance and stability.

Various non-linear functions of autocorrelation functions have been found to further enhance specimen identification and these are shown and described in U.S. patent application Serial Number 93,070, filed on March 3, 1961 by Lawrence P. Horwitz and Glenmore L. Shelton, Jr., entitled Specimen Identification Apparatus and Methods and in U.S. patent application Serial Number 115,501, filed on June 7, 1961 by Jose Reines, Lawrence P. Horwitz and Glenmore L. Shelton, Jr., entitled Specimen Identification Apparatus and Methods.

The advantages that accrue from using basic autocorrelation functions are often accentuated by the use of more complex higher-order autocorrelation functions as shown in U.S. patent application Serial Number 118,124, filed on June 19, 1961 by Herman H. Goldstine, Lawrence P. Horwitz and Glenmore L. Shelton, Jr., entitled Specimen Identification Methods and Apparatus.

The present invention teaches methods and apparatus for specimen identification making use of functions of higher-order autocorrelation functions, and methods for selecting a relatively small number of these functions from the extremely large number that are available to provide an economical identification system which retains the advantages that accrue from using higher-order autocorrelation functions.

The use of the basic, first-order autocorrelation function for specimen identification is described in detail in the above-cited U.S. patent application, Serial Number 45,034. Using this technique, if the specimen to be identified is considered to be a matrix of discrete areas having coordinates $(x, y)$ that are predominately black or predominately white, depending upon the positions of the lines that the specimen comprises, there is a function $f(x, y)$ that is "1" for each instance where the area about the coordinates $(x, y)$ is black and "0" where white. The first-order autocorrelation function of the specimen function defines the number of pairs of black areas separated by a given distance in a given direction (vector), over all distances and directions (vectors). If $(x, y)$ is a point on the pattern, and $(x+x^{(1)}, y+y^{(1)})$ is another point on the pattern separated from the point $(x, y)$ by $(x^{(1)}, y^{(1)})$, then the product $f(x, y)f(x+x^{(1)}, y+y^{(1)}) = 1$ only where both points are black. This procedure is performed for every pair of points in the specimen to generate the first-order autocorrelation function $D^{(1)}(x^{(1)}, y^{(1)})$ which is defined as:

$$D^{(1)}(x^{(1)}, y^{(1)}) = \sum_{x, y} f(x, y) f(x+x^{(1)}, y+y^{(1)}) \quad (1)$$

The specimen "S" is then compared to (correlated with) a similar function $D_{R_a}^{(1)}(x^{(1)}, y^{(1)})$ of each reference pattern $R_a$, and normalized with respect to $D_{R_a}^{(1)}(x^{(1)}, y^{(1)})$ to provide comparison sums $S_{S,R_a}$ as follows:

$$S_{S, R_a} = \frac{\sum_{x^{(1)}, y^{(1)}} D_S^{(1)}(x^{(1)}, y^{(1)}) \cdot D_{R_a}^{(1)}(x^{(1)}, y^{(1)})}{\left\{ \sum_{x^{(1)}, y^{(1)}} [D_{R_a}^{(1)}(x^{(1)}, y^{(1)})]^2 \right\}^{1/2}} \quad (2)$$

where:

$$\left\{ \sum_{x^{(1)}, y^{(1)}} [D_{R_a}^{(1)}(x^{(1)}, y^{(1)})]^2 \right\}^{1/2} \quad (3)$$

is the normalization factor. The reference pattern $R_a$ that produces the largest comparison sum determines the identification of the specimen. Normalization guarantees that the largest sum is caused by the reference pattern that is most similar to the specimen.

The use of higher-order autocorrelation functions for specimen identification is described in detail in the above cited U.S. patent application, Serial Number 118,124. The second-order autocorrelation function $D^{(2)}x^{(1)}, y^{(1)}; x^{(2)}, y^{(2)})$ defines the specimen in terms of the triples of black areas within the specimen which are separated by each pair of vectors $(x^{(1)}, y^{(1)})$ and $(x^{(2)}, y^{(2)})$. This function may be defined as:

$$D_s^{(2)}(x^{(1)}, y^{(1)}; x^{(2)}, y^{(2)}) = \Sigma [f(x, y)] \quad (4)$$
$$\cdot [f(x+x^{(1)}, y+y^{(1)})] \cdot [f(x+x^{(2)}, y+y^{(2)})]$$

Similarly, the $n$th-order autocorrelation function of the specimen may be defined as:

$$D_s^{(n)}(x^{(1)}, y^{(1)}; \ldots; x^{(n)}, y^{(n)}) = \Sigma [f(x, y)] \quad (5)$$
$$\cdot [f(x+x^{(1)}, y+y^{(1)})] \cdot \ldots \cdot [f(x+x^{(n)}, y+y^{(n)})]$$

For simplicity of expression, the substitution:

$$f(r) = f(x, y) \quad (6)$$

is made into (1), (4) and (5) to provide:

$$D^{(1)}(r^{(1)}) = \sum_r f(r) \cdot f(r+r^{(1)}) \quad (7)$$

$$D^{(2)}(r^{(1)}, r^{(2)}) = \sum_r f(r) \cdot f(r+r^{(1)}) \cdot f(r+r^{(2)}) \quad (8)$$

$$D^{(n)}(r^{(1)}, \ldots, r^{(n)}) = \sum_r f(r) \cdot f(r+r^{(1)}) \cdots f(r+r^{(n)}) \quad (9)$$

A zero-order autocorrelation function which merely represents the total number of matrix areas that are covered by the specimen is defined as:

$$D^{(0)} = \sum_r f(r) \quad (10)$$

Specimen identification based on $n$-th order autocorrelation functions can be accomplished by comparing the functions of the specimen with similar functions of reference patterns according to Equation 2 where the first order functions are replaced with $n$th order functions.

A specimen identification system utilizing autocorrelation function comparison is inherently registration invariant because the functions are summed over $x, y$ to provide a result that is independent of the actual specimen position.

Thus, each element of a first-order autocorrelation function represents a pair of points on the input pattern displaced from each other by a given vector (that is, by a given amount in a given direction). Similarly each element of a second-order autocorrelation function represents a triple of points on the input pattern whose relative positions may be described by two independent vectors, and each element of a $n$th-order autocorrelation function represents an $n$-tuple of points ($n+1$ points) on the input pattern whose relative positions may be described by $n$ independent vectors. The terms $n$th order and $n$-tuple are general terms standing for any order and any number of points and hence an $n$th order autocorrelation function represents a function of $n$-tuples which correspond to $n+1$ point combinations.

For simplicity, the autocorrelation function has been described above as a function of combination of points that are present within the input pattern. This may be extended to the more general case to include combinations of points that are present and points that are not present in the input pattern, resulting in:

$$\sum_r [a_{00}f(r)+a_{01}\overline{f(r)}]\cdot[a_{10}f(r+r^{(1)})+a_{11}\overline{f(r+r^{(1)})}] \ldots$$
$$\cdot[a_{n0}f(r+r^{(n)})+a_{n1}\overline{f(r+r^{(n)})}]$$

(11)

where either $a_{10}$ or $a_{11}$ is equal to one, and the other is equal to zero.

The generalized autocorrelation function described by (11) above forms the basis from which are obtained the measurements used in the preferred embodiment of the invention. When all $a_{10}=1$, the basic $n$th-order autocorrelation function described previously is obtained, and when, one or more $a_{11}=1$, the $n$th order autocorrelation function representing $n$-tuple of points within and without the input pattern is obtained. If, for example, the input pattern is a black character on a white document, each element of the generalized $n$th-order autocorrelation function is representative of the number of occurrences of a particular $n$-tuple of black and white points on the document.

In accordance with the present invention, selected elements of the generalized autocorrelation function (representing selected $n$-tuples of black and white points on the document) are generated and analyzed to provide an indication of the identity of the specimen. The set of elements of the generalized autocorrelation function is selected by a method which insures accurate specimen identification with a relatively small amount of equipment. This selection is based on the use of information and redundancy measures on tentatively selected elements. These measures utilize conditioned probability calculations based on sample input patterns. In a preferred embodiment of the invention, the selected set of elements corresponding to the specimen is weighted and compared to a similar set of elements corresponding to reference patterns using a Bayes Rule decision procedure, to establish the identity of the of the specimen.

An object of the present invention is to provide methods and apparatus for specimen identification making use of functions of autocorrelation functions.

Another object of the present invention is to provide methods and apparatus for specimen identification making use of generalized autocorrelation functions, and functions of generalized autocorrelation functions.

A further object of the invention is to show methods and apparatus for specimen identification making use of non-linear functions of generalized $n$th-order autocorrelation functions.

Another object of the present invention is to show methods and apparatus of specimen identification based on an analysis of selected $n$-tuples on a document containing the specimen.

A further object is to provide methods and apparatus for specimen identification utilizing elements of generalized autocorrelation functions, where at least one element corresponds to an $n$-tuple of points with the requirement that at least one point in the $n$-tuple is not present in the specimen.

Another object is to provide methods and apparatus for specimen identification utilizing elements of functions including non-linear functions, of generalized autocorrelation functions where at least one element corresponds to an $n$-tuple of points with the requirement that at least one point in the $n$-tuple is not present in the specimen.

Another object is to show methods and apparatus for specimen identification based on an analysis of $n$-tuples representing the presence and absence of points within the specimen.

A further object is to show methods and apparatus for specimen identification based on an analysis of selected $n$-tuples representing the presence and absence of points within the specimen.

Another object is to show methods and apparatus for specimen identification based on a Bayes Rule analysis of functions of generalized autocorrelation functions.

Another object is to provide methods and apparatus for specimen identification based on a Bayes Rule analysis of $n$-tuples representing the presence and absence of points within the specimen.

A further object is to show statistical methods for designing specimen identifications systems.

Another object is to provide statistical methods for analyzing the discriminating value of measures to be used for specimen identification.

A further object is to provide statistical methods for generating and evaluating measures to be used for specimen identifiaction.

The foregoing and other objects, features and advantages of the invention will be apparent from the following more particular description of preferred embodiments of the invention, as illustrated in the accompanying drawings.

In the drawings:

FIGURE 5 shows the relationship of FIGURES 5a and 5b.

FIGURES 5a and 5b compose a chart indicating typical values of resistances for the summing amplifier input networks shown in FIGURE 3.

Figure 1:
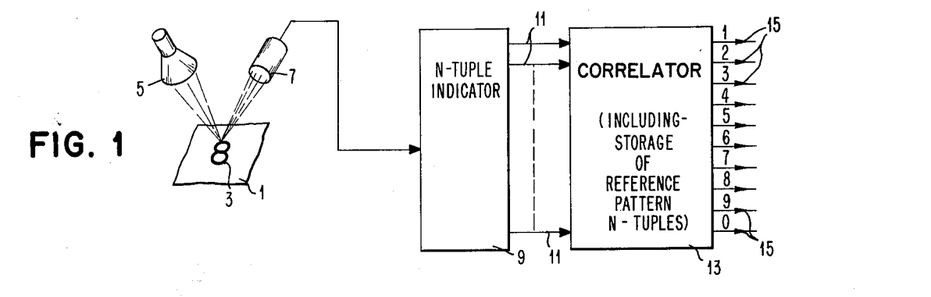
FIGURE 1 is a block diagram of a preferred embodiment of the invention.
Figure 2A:
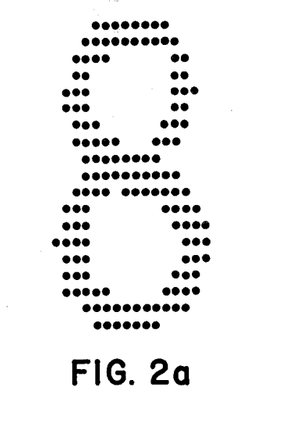
FIGURE 2a is a diagram showing a typical input specimen.

A preferred embodiment of the invention is shown in FIGURE 1, where a document 1 containing a printed specimen 3 is scanned by a flying-spot, cathode ray tube scanner 5 and a photodetector device 7. The specimen to be identified is scanned by a spot of light which traverses a raster of adjacent parallel lines. The output of the photodetector device 7 is sampled by a circuit (not shown in FIGURE 1) to produce a sequential binary signal indicative of the specimen being scanned and a sample is illustrated pictorially in FIGURE 2a, where each dot in the matrix represents a binary "1" signal and the absence of a dot corresponds to a binary "0" signal.

Figure 2B:
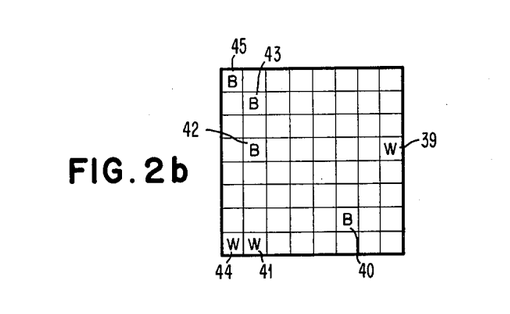
FIGURES 2b, 2c and 2d are diagrams showing typical 7-point $n$-tuples and typical constraints upon their location.
Figure 2C:
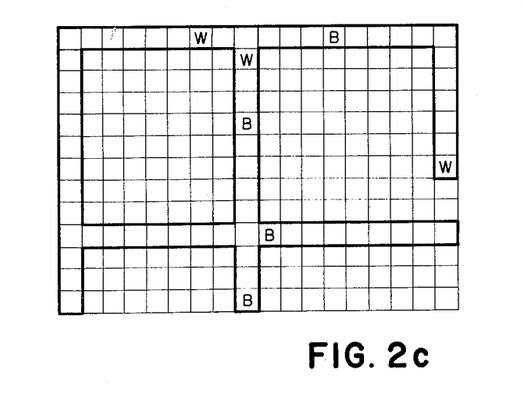
Figure 2D:
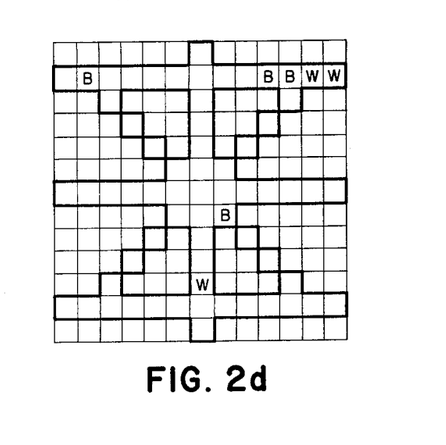

The binary representative generated by the photodetector is applied to an $n$-tuple indicator which provides an indication of the presence or absence of each selected $n$-tuple on an output lead 11. Each output lead 11 corresponds to an $n$-tuple and contains a binary "1" signal when the corresponding $n$-tuple is present on the document and a binary "0" signal when the corresponding $n$-tuple is absent. In the preferred embodiment of the invention, "bipolar" $n$-tuples are used. That is, each $n$-tuple may represent an $n$-point combination of black areas, white areas or, more commonly, black and white areas. In this embodiment, 7-point $n$-tuples are used (which are a function of the generalized sixth-order autocorrelation function). The $n$-tuples are selected from a large number of quasi-randomly generated $n$-tuples. FIGURES 2b, 2c and 2d indicate three typical 7-point combinations of black and white areas. These combinations are generated at random from among all of the possible 7-point combinations that are possible within the constraints of the heavy lines. In FIGURE 2b, the constraint is a limitation to combinations which have all points within a square having sides that are eight elements long. (The reference numerals in FIGURE 2b will be described below with the detailed description of the system.) The constraint shown in FIGURE 2c is found to be useful because its enclosed seven-point combinations are present in many characters having a parallel line structure with right-angle line intersections. FIGURE 2d indicates the third type of constraint that was found to be extremely useful and it contains combinations that aid in the identification of characters having vertical, horizontal and diagonal line structures enclosing right angles and 45° angles. These constraints are used, not only to highlight certain commonly-occurring line configurations, but also to limit the number of seven-point combinations from which the selection is made. Obviously, other constraints (or no constraints) can be used in the generation of $n$-tuples to be used in analyzing specimens. Furthermore, the selection of seven-point combinations is arbitrary and $n$-tuples of any size or combinations of sizes can be used. The randomness of the selected seven-point combinations is further constrained in that those randomly-generated combinations or groups of combinations which provide low discrimination between different specimens are replaced by more discriminating combinations. In the preferred embodiment of the invention, 39 seven-point combinations, are used but the number of combinations is obviously not critical to the operation of the invention.

The output of the $n$-tuple indicator 11 is analyzed in a correlator 13 which weights and compares the specimen $n$-tuple data to similar data corresponding to reference patterns. The reference pattern having $n$-tuples that are the most similar (or identical) to the corresponding specimen $n$-tuples is indicative of the identity of the specimen and a corresponding signal is generated on a lead 15. The data is weighted to account for the relative discriminatory values of each measure with respect to each reference. That is, measures which are highly-discriminatory for certain references are given more weight with respect to those references than less discriminatory measures. Obviously the same measure usually provides different discriminatory ability for different references.

Figures 3, 3A:
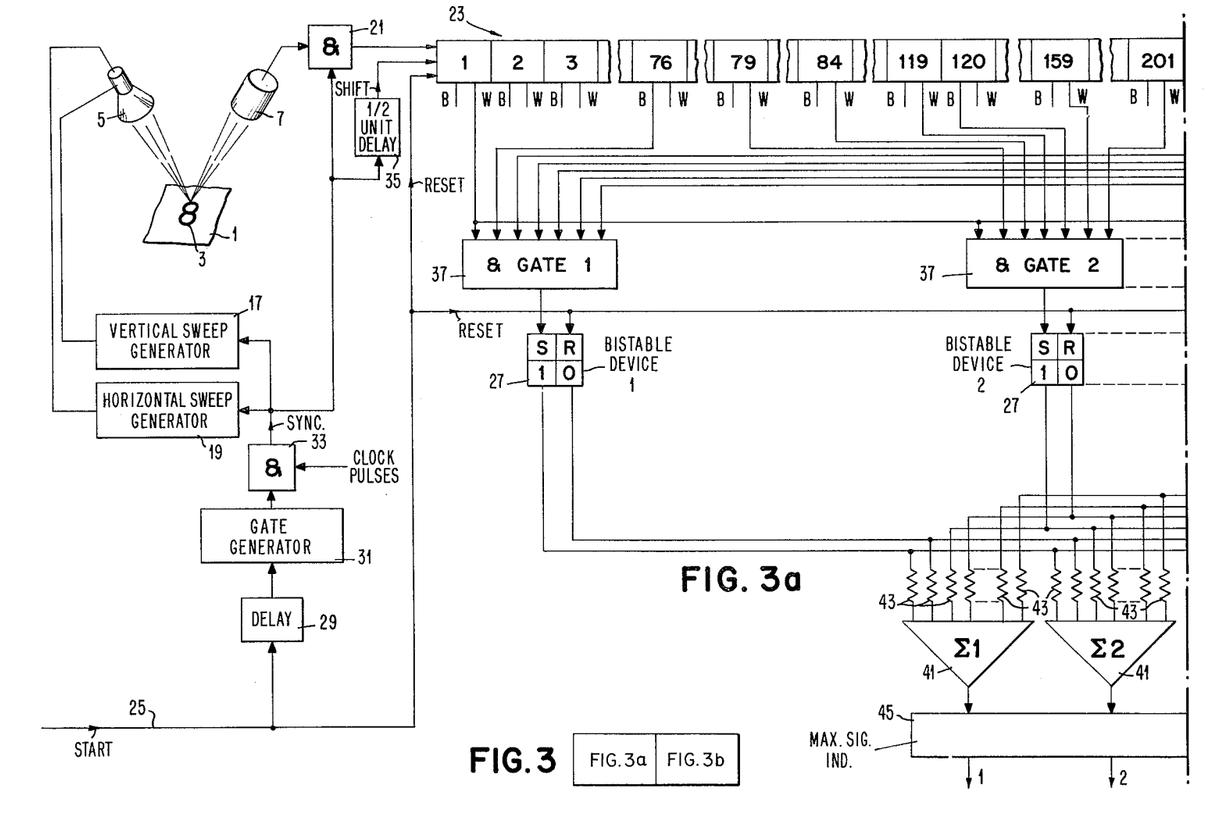
FIGURE 3 shows the relationship of FIGURES 3a and 3b.
FIGURES 3a and 3b are functional diagrams of the preferred embodiment of the system that is shown in FIGURE 1.
Figure 3B:
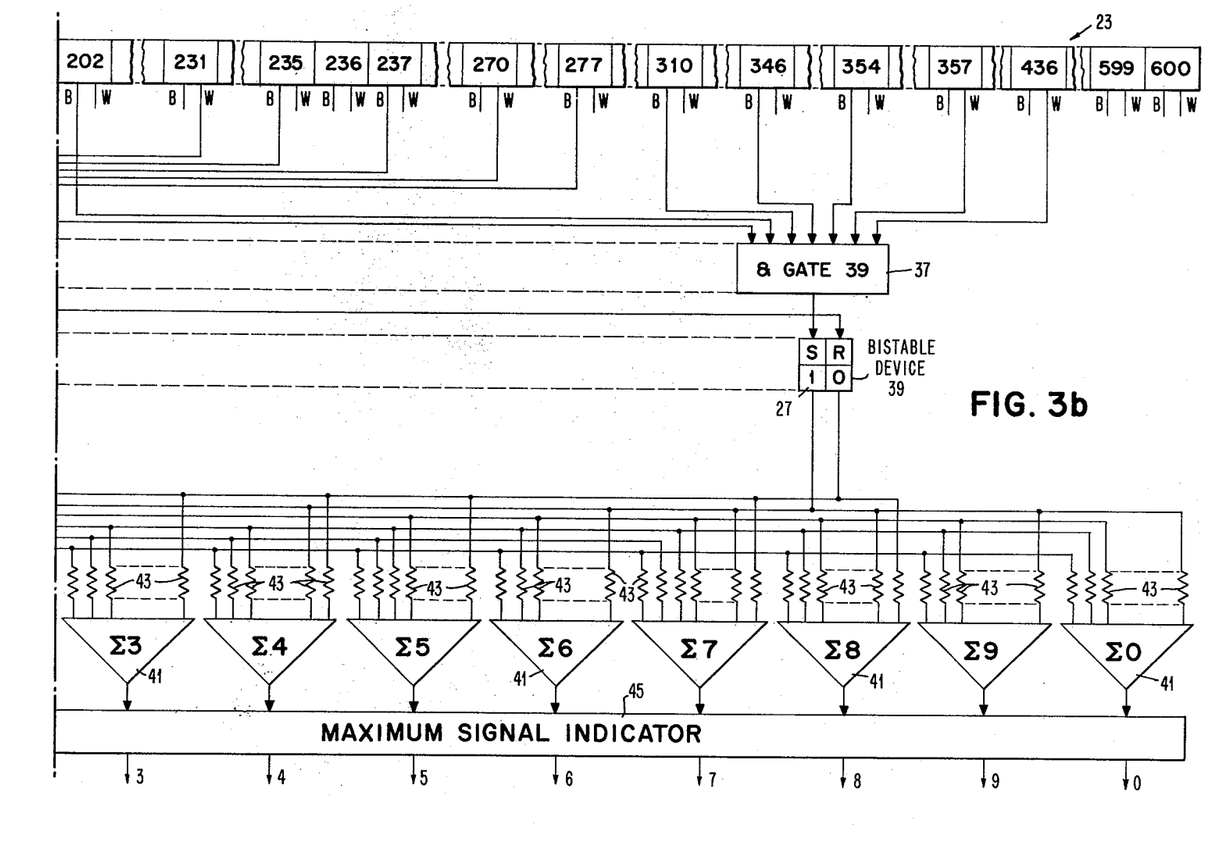

A functional diagram of the invention is shown in FIGURE 3. The reference numerals used in this diagram correspond to those used in FIGURE 1 to the extent possible.

In FIGURE 3, a high-speed vertical sweep generator 17 and a lower-speed horizontal sweep generator 19 cause the beam of light from the flying spot scanner 5 to traverse the document 1 in a raster of adjacent vertical lines. In this embodiment, the beam of light travels from top to bottom along vertical lines that are generated from left to right. The light reflected by the document 1 is applied to a photodetecter 7 which produces a binary "0" output signal when struck by light from the document background and produces a binary "1" output signal when the dark-colored specimen 3 reduces the intensity of reflected light. This binary signal is sampled by an "and" gate 39 times during each vertical sweep (32 times while sweeping and 7 times during retrace) to produce a signal corresponding to the pattern shown in FIGURE 2a where each dot corresponds to a binary "1." This sampled signal is applied to a shift register having 600 positions (which is sufficient to contain, at the same time, all input data that may be needed to produce any $n$-tuple within the constraints shown in FIGURES 2b, 2c and 2d). The data in the register is shifted toward the right as newly-scanned data is applied to the left end of the register. Timing signals insure proper system operations and are initiated by a "start" signal on a lead 25. The start signal occurs before the specimen is scanned and is used to reset the shift register 23 and bistable devices 27. The start signal is also applied through a delay circuit 29 to a gate generator 31. The delay insures that the resetting operation is accomplished before the other timing signals are generated. The output of the gate generator is applied to condition an "and" gate 33 which passes clock pulses to synchronize the sweep generators 17 and 19. The high-speed vertical sweep generator 17 is free-running and generates a sequence of sweep signals that is synchronized at the beginning of each vertical sweep by the 1st, 40th, 79th, etc., clock pulses.

The clock pulses are also applied to condition the sampling "and" gate 21 and, after a delay equal to one-half of the time between clock pulses, to shift the data in the register 23. The one-half unit delay is provided by a delay circuit 35 which insures that the sampled data is received by the register before the register is shifted.

The shift register is conventional in design. It is comprised of a sequence of bistable elements arranged in tandem. Each element generates two output signals, labelled "B" and "W" which stand for black and white and correspond to the specimen area and document background area, respectively. Thus, when a section of the shift register stores binary "1" data corresponding to a scanned black area, the "B" output of the register section contains a binary "1" signal and the "W" output contains a binary "0" signal. Similarly, when a section of the shift register stores binary "0" data corresponding to a scanned white area, the "W" output of the register section contains a "1" signal and the "B" output contains a "0" signal.

The output of the shift register sections are applied to a group of "and" gates 37 which, in combination with a group of bistable devices 27, perform the function of $n$-tuple indication as indicated in the block diagram of FIGURE 1 by the reference numeral 9. The combination of a shift register and a group of "and" gates, each controlled by a group of shift register outputs, generates a function of the autocorrelation function. Each seven-inputs "and" gates 37 generates the function:

$$[a_{00}f(r)+a_{01}\overline{f(r)}]\cdot[a_{10}f(r-r^{(1)})+a_{11}\overline{f(r-r^{(1)})}]\ldots$$
$$\cdot[a_{60}f(r-r^{(6)})+a_{61}\overline{f(r-r^{(6)})}] \quad (12)$$

where $a_{10}=1$ for shift register "B" connections
$a_{11}=1$ for shift register "W" connections
$f(r)=$output of shift register section number 1
$r^{(i)}=$one less than the number of a connected shift register section Thus, "& gate 1" (reference numeral 37) which is connected to register sections 1W, 76B, 231W, 235B, 237B, 270W, and 277B generates the function:

$$f(r)\cdot f(r-75)\cdot\overline{f(r-230)}\cdot f(r-234)$$
$$\cdot f(r-236)\cdot\overline{f(r-269)}\cdot f(r-276) \quad (13)$$

This function represents the seven-point combination shown in FIGURE 2b, at the time $f(r)$ (in the first shift register section) contains the W data bit indicated by the reference numeral 39. This data bit is scanned after the other data bits with reference numerals 40–45 because the document is scanned by a sequence of top-to-bottom vertical lines, from left to right. Since each vertical scan requires 39 units of time (32 units for scanning and 7 units for retracing), the B data bit 40 is scanned 75 units of time before data bit 39; the W data bit 41 is scanned 230 units of time before data bit 39; the B data bit 42 is scanned 234 units of time before data bit 39; the B data bit 43 is scanned 236 units of time before data bit 39; the W data bit 44 is scanned 269 units of time before data bit 39; the B data bit 45 is scanned 276 units of time before data bit 39. Thus the function (13) is seen to represent the output of "& gate 1."

The thirty-nine selected n-tuples that are used in the preferred embodiment at their shift register connections of the invention are shown in the following chart:

| N-tuple Number | Shift Register Connections | | | | | | |
|---|---|---|---|---|---|---|---|
| 1 | 1W | 76B | 231W | 235B | 237B | 270W | 277B |
| 2 | 1W | 79W | 84W | 119W | 120B | 159W | 201W |
| 3 | 1W | 35B | 78W | 156W | 232B | 234W | 276B |
| 4 | 1B | 38W | 42B | 79B | 156B | 158W | 193B |
| 5 | 1B | 26B | 37B | 111B | 116W | 231W | 234B |
| 6 | 1W | 42B | 77B | 121W | 153W | 159W | 194B |
| 7 | 1B | 86B | 197B | 235B | 237W | 278W | 279W |
| 8 | 1B | 5W | 80B | 119B | 236B | 241B | 274B |
| 9 | 1B | 45B | 50B | 206W | 235W | 315W | 396B |
| 10 | 1W | 41W | 44B | 78W | 157W | 239B | 351B |
| 11 | 1B | 5B | 49B | 156B | 158W | 237W | 244W |
| 12 | 1W | 196W | 311W | 315W | 352B | 386B | 395B |
| 13 | 1B | 161W | 205B | 239W | 352B | 361B | 401W |
| 14 | 1W | 10B | 39W | 47B | 78W | 356B | 361B |
| 15 | 1W | 40W | 79B | 118B | 190B | 226W | 430B |
| 16 | 1B | 50B | 123B | 200B | 244W | 316W | 391W |
| 17 | 1B | 157B | 160B | 163B | 165B | 168B | 313B |
| 18 | 1B | 192B | 193B | 196B | 200B | 274B | 469B |
| 19 | 1W | 82W | 84B | 123B | 318W | 396W | 430B |
| 20 | 1W | 6B | 121W | 284B | 352B | 362B | 430W |
| 21 | 1B | 84W | 112B | 119W | 235W | 269B | 352B |
| 22 | 1B | 161B | 201B | 233W | 347B | 386B | 396B |
| 23 | 1B | 74W | 77W | 192W | 194B | 267B | 269B |
| 24 | 1W | 6W | 195W | 239B | 395B | 464B | 469B |
| 25 | 1B | 6B | 157W | 158W | 269B | 308B | 348B |
| 26 | 1B | 147B | 191W | 235B | 267W | 311W | 381W |
| 27 | 1W | 69B | 152B | 186W | 235W | 351W | 391B |
| 28 | 1B | 118W | 157W | 275W | 318W | 349B | 430B |
| 29 | 1W | 6B | 40W | 84B | 162W | 243B | 474B |
| 30 | 1W | 30B | 110B | 226B | 230W | 382B | 464B |
| 31 | 1W | 31W | 106W | 114B | 343W | 418B | 428B |
| 32 | 1W | 270B | 304W | 391B | 421B | 577W | 579W |
| 33 | 1W | 109B | 118B | 196W | 271W | 430W | 508B |
| 34 | 1W | 223B | 421B | 469B | 535W | 543W | 546B |
| 35 | 1W | 278B | 281W | 361B | 556W | 585B | 587W |
| 36 | 1B | 3B | 121W | 130W | 286W | 313B | 318B |
| 37 | 1W | 31B | 34W | 38W | 341B | 347B | 349W |
| 38 | 1B | 118B | 272B | 274B | 279B | 361W | 585W |
| 39 | 1W | 202B | 310B | 346B | 354B | 357W | 436W |

Each "and" gate 37 output is applied to the set ("S") input of a bistable device 27 which has been previously reset by the application of the "start" signal to their reset ("R") input. A bistable device has two stable states and is capable of storing a single bit of binary data. Many devices have this capability, including the well-known flip-flop circuit. The bistable devices are "set" when a signal is applied to their "S" input and, in this condition, provide a binary "1" signal at their "1" outputs and a binary "0" signal at their "0" outputs. The outputs are reversed when the bistable devices are reset. Each bistable device corresponds to an n-tuple and is set if the n-tuple is present at any location in the document. This location invariance with respect to the presence of the n-tuples is achieved by shifting the scanned data through the shift register, and hence, every selected n-tuple that is present on the document activates its corresponding "and" gate 37 and sets its corresponding bistable device 27 at some time during the identification cycles. The bistable devices do not count the number of occurrences if the corresponding n-tuple (as would be done to obtain an element of the autocorrelation function) but rather the bistable devices, when set, indicate that at least one occurrence of the n-tuple exists. A bistable device is not set during the identification cycle if its corresponding n-tuple is absent from the document. Thus, the bistable devices store a non-linear function of elements of the generalized autocorrelation function rather than the elements themselves, where the particular non-linear function that is produced is a binary function, representing the elements of the generalized autocorrelation function with their values clipped at +1. That is, any element of the generalized autocorrelation function whose value is greater than zero is represented by +1 and all zero values are represented by 0.

The output of the thirty-nine bistable devices 27 is a 39-bit binary word that describes the specimen by its features (n-tuples). Specimen identification based on this small amount of data has been found to be almost as discriminating and stable as identification based on the entire generalized autocorrelation function of corresponding order when the reduced data is properly selected from the extremely large amount of available data. As described briefly above, several constraints are made on the location of the n-tubles. The constraints used in the preferred embodiments are shown in FIGURES 2b, 2c and 2d and are chosen so that local features of the specimen are emphasized while some global information is extracted. The constraints shown in FIGURES 2b, 2c and 2d are merely illustrations of typical constraints that can be chosen. The n-tuples could be chosen without constraining their bounds, if desired, but this radically increases the computational effort that is required to select a reduced number of discriminating n-tuples. At least two strategies are available for selecting n-tuples within the predetermined constraints. The first strategy selects n-tuples as follows:

A pair or triple (or other r-tuple, where $n > r$) is evaluated for discriminating ability by a procedure such as that outlined below. An additional point is added to this point combination where the added point is selected to provide a resulting combination having a high discriminating ability. This procedure is repeated until an n-tuple is generated. The second strategy utilizes simple random selection of n-tuples with constrained regions. This second strategy is used in the preferred embodiment of the invention because it requires considerably less computation than the first strategy.

An "information" measure is used to determine the worth of each of the selected n-tuples (independently of the worth of the others). A redundancy measure is then used to obtain greater independence by determining overlap in discrimination availed by the set of selected n-tuples so that redundant n-tuples are replaced by more informative (discriminating) n-tuples. In the preferred embodiment, the information measure selects those randomly-generated n-tuples which are present in approximately half of the reference patterns and absent in the others, while the redundancy measure indicates those n-tuples from among the n-tuples selected by the information measure, which add a significant increment to the discrimination provided by previously chosen n-tuples. Both the information measure and the redundancy measure are based on conditional probabilities which are calculated from a representative sampling of input patterns. Consider a specimen identification system with M parameters (n-tuples), $x_1, x_2 \ldots x_M$ that is used to classify specimens among $m$ difference reference patterns $c_1, c_2 \ldots c_M$. Then the conditional probability distribution of the reference pattern set $P\{c_i | \bar{x}\}$, given the particular state of the M parameters (n-tuples) $\bar{x}$, completely describes the input for any state of the M parameters. A valuable set of parameters has a peaked distribution. That is, one of the reference patterns has a probability near one, and the other $m-1$ patterns have probabilities near zero, and the specimen can be identified with a high likelihood of accuracy. If, on the other hand, the probabilities are all nearly equal, the set of n-tuples is poor. The following information measure is one that is useful in obtaining a quantitative value for the tentatively selected parameters (n-tuples) when used for classifying a sampling of input patterns:

$$I = \log_2 m + \sum_{\bar{x}} P\{\bar{x}\} \sum_{i=1}^{m} P\{c_i | \bar{x}\} \log_2 P\{c_i | \bar{x}\}$$

(14)

where $P\{\bar{x}\}$ is the probability of the parameter state $\bar{x}$, $c_1$ corresponds to the $i$th reference pattern, and the first sum is taken over all states of the parameter set.

This measure is not only useful in determining the value of the complete set of parameters $\bar{x}$ but it is also applied in evaluating each particular $n$-tuple $j$. In the latter case, $x_j$ has two states and the probabilities $P\{c_i|x_j\}$ and $P\{x_j\}$ are computer. I is 0 if the logic has no discrimination; that is when the $n$-tuple is either contained in all reference patterns or in no reference patterns, and I is maximum ($I=1$) when half of the set of reference patterns contain the $n$-tuple and the other half do not contain the pattern. In the preferred embodiment of the invention, only $n$-tuples with information measures (I) exceeding 0.5 are retained.

The randomly-generated $n$-tuples which are tentatively selected by the information measure are then subjected to the redundancy measure. The information measure could theoretically select $n$-tuples, each of which partitions the set of reference patterns into the same two halves. However, a random choice of $n$-tuples generally leads to a somewhat random partitioning of the set of reference patterns but this partitioning is not sufficiently random to guarantee that sufficient $n$-tuples exist to clearly discriminate between all reference patterns which have similar structure, such as "OQ" and "$i1$." Each of the N $n$-tuples having a sufficiently high information measure is tested by computing the pairwise information measure $I_{lk,j}$ for every pair of reference patterns $c_l$ and $c_k$ and each $n$-tuple $x_j$.

$$I_{lk,j} = 1 + \sum_{x_j=0,1} [P\{x_j\}] \cdot [P\{c_l|x_j\} \log_2 P\{c_l|x_j\} + P\{c_k|x_j\} \log_2 P\{c_k|x_j\}] \quad (15)$$

The values $I_{lk,j}$ may viewed as the elements of an $C_2^m$ by N matrix ($I_{ij}$) where each information value, $I_{ij} = I_{lk,j}$, indicates the separation power of the $j$th measurement on the $i$th pair of reference patterns $c_l$ and $c_k$. The elements are then quantized into zeros and ones where $I_{ij}$ is set equal to one if it is greater than a predetermined threshold value and otherwise set equal to zero. Assuming that $r$ measurements are required to distinguish each pair, the threshold value is chosen such that it produces at least $r$ ones in each row of the matrix. Next, the rows are rearranged such that the number of ones in each row increases as $i$ increases, and the number of ones in each column decreases as $j$ increases. Each row in the matrix is then checked and the columns marked that produce $r$ ones in each row. Only the marked measurements ($n$-tuples) are preserved.

The following examples illustrate the redundancy measure procedure. The matrix shown below represents a typical quantized and rearranged pairwise information matrix ($I_{ij}$). It is required that this matrix be reduced so that the minimum distance $r$ is three and thus at least three one's be left in each row after reduction. The columns below, that are marked, represent the reduced set of $n$-tuples resulting from this selection procedure.

```
    x x x x x x
1 0 1 1 0 0 0 0 0 0 0 0
1 1 0 1 0 0 0 0 0 0 0 0
1 0 0 0 0 0 1 1 0 0 0 0
1 1 0 1 1 0 0 0 0 0 0 0
1 1 1 0 0 1 0 0 0 0 0 0
0 0 1 1 1 0 0 0 1 0 0 0
1 0 1 0 1 1 1 0 0 0 0 0
1 1 1 1 0 0 0 0 0 1 0 1
1 1 1 0 0 1 1 0 0 0 1 0
1 1 0 0 1 1 0 1 1 0 0 0
```

The 39 $n$-tuples that are used in the preferred embodiment of the invention are selected by this measure.

The parameters ($n$-tuples) at the output of the bistable devices 27 are analyzed to provide an indication of the identity of the specimen. Various analysis (comparison) techniques can be employed, including Bayes Rule decision procedures, minimum distance analysis, and cross-correlation. In the preferred embodiment of the invention, a Bayes Rule decision procedure is implemented by resistor networks and summing amplifiers.

The 39-bit binary word at the output of the bistable devices 27 (which indicates the presence or absence of the 39 selected $n$-tuples) is applied to each of a group of summing amplifiers 41. Each summing amplifier corresponds to a single reference pattern and, in the preferred embodiment, each corresponds to one of the ten digits. The summing amplifier input resistances 43 have values dependent upon the frequency of occurrence of the various $n$-tuples in a group of sample reference patterns.

For example, the summing amplifier labelled $\Sigma 4$ (corresponding to the digit "4") has input resistance values related to the percentage of sample digits "4" which contain each $n$-tuple. For example, when an $n$-tuple is found to occur in almost all samples of the digit "4," the $n$-tuple is weighted relatively heavily. These percentages (conditional probabilities) may be described as:

$$P\{x_j|c_i\}$$

where $x_j$ is the selected $n$-tuple and $c_i$ is the reference pattern.

The summing amplifier having the largest output signal is indicative of the identity of the specimen in accordance with a Bayes Rule decision procedure:

$$\text{Max}_i \left[ G_i = \pi P\{x_j|c_i\} \right] \quad (16)$$

The state of each bit $x_j$ from the bistable devices 27 determines which of two probabilities $P\{x_j=1|c_i\}$ or $$P\{x_j=0|c_i\} = 1 - P\{x_j=1|c_i\}$$

is multiplied for each reference pattern $c_i$ to compute $G_i$ which is proportional to the inverse probability $P\{c_i|\bar{x}\}$ with the assumption of independence on the $x_j$'s and equal a priori probabilities $P\{c_j\}$.

Since the decision procedure requires multiplication, the summing amplifiers add the logarithms of the functions in accordance with $$\text{Max}_i \left[ G_i = \sum_j \log P\{x_j|c_i\} \right] \quad (17)$$

Thus, each summing amplifier input resistance corresponds to the logarithm of a probability. In the present embodiment, the resistance values (in kilohms) shown in FIGURE 5 are used, where an indicated value of infinity ($\infty$) corresponds to an open circuit. The first column of FIGURE 5 indicates the connection to the bistable device and the remaining columns indicate the summing amplifier connections. For example, the numbers in the third row ($2^1$) of the chart indicate the values (kilohms) of the resistances between the "1" output of the bistable device "2" and the various summing amplifiers. The following example shows the calculation of relative resistance values for the two resistances between a bistable device (corresponding to $n$-tuple $x_j$) and a summing amplifier (corresponding to a reference pattern $c_i$). If the selected $n$-tuple $x_j$ occurs in 75% of the sample patterns $c_i, P\{x_j=1|c_i\} = \frac{3}{4}$ and the inverse $$P\{x_j=0|c_i\} = \frac{1}{4}$$

and the resistance between the "1" output of bistable device "$j$" and summing amplifier "$i$" has a relative value of $$\frac{1}{\log \frac{3}{4}}$$

and the resistance between the "0" output of the bistable device and the summing amplifier has a relative value of $$\frac{1}{\log \frac{1}{4}}$$

(where logarithms are taken to enable the summing amplifier to perform multiplication and where the inverse of the quantities are used to account for the conventional operation of summing amplifiers and their input resistance networks). After all relative resistance values have been calculated, they are multiplied by a constant to provide resistance values within the operating range of the circuits used.

Thus, the specimen is interrogated for the presence or absence of selected $n$-tuples (features) and this data is multiplied by the conditional probabilities that have been previously established by the used of sample reference patterns. The largest product (summing amplifier output) is indicative of the identity of the specimen.

A maximum signal indicator 45 generates an output signal indicative of the largest input signal. This circuit is shown in detail in FIGURE 4. The identity of the specimen is indicated, or a reject is indicated, by the glowing of a corresponding output lamp 201.

Figure 4:
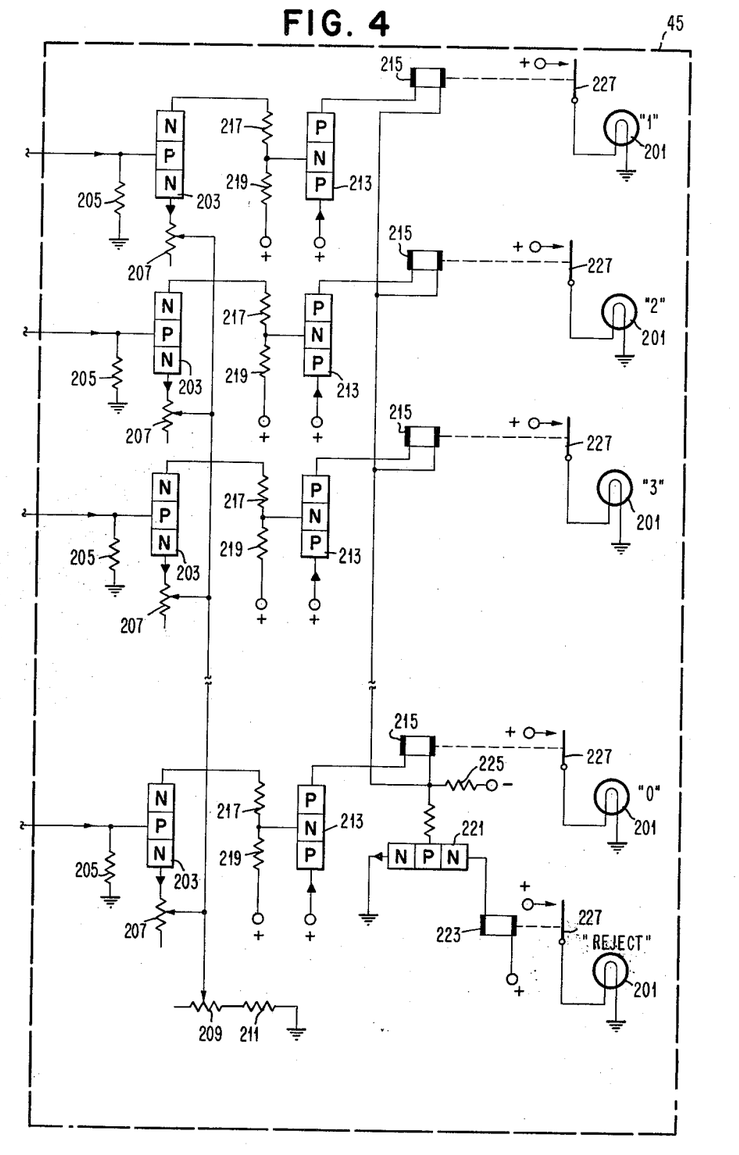
FIGURE 4 is a detailed diagram of a maximum signal indicator that is suitable for use in the system shown in FIGURE 3.

The input signals (from the summing amplifiers 41 in FIGURE 3) are applied to the base connections of a group of NPN type transistors 203. Each transistor base circuit includes a resistor 205 to protect the transistor in the case of a disconnected input signal. The emitter-base connection of the transistors provides a diode action that, in conjunction with resistors 207, and a common path for current including resistors 209 and 211, permits current flow only to the transistor base to which the most positive signal is applied. The voltage drop across resistors 209 and 211 back-biases the transistors 203 associated with the less positive input signals, preventing current flow in their base circuits. The sensitivity of the circuit is defined as the amount that the most positive input signal must exceed the adjacent (second most positive signal) to back-bias the transistor associated with the latter signal. The sensitivity is controlled by the setting of resistor 209. Resistors 207 are adjusted to provide a constant and equal emitter resistance for all of the transistors 203 regardless of the setting of resistor 209. As the common resistance in the emitter circuits is varied by a change in the setting of resistor 209, the settings of resistors 207 are changed in the opposite direction to maintain a constant total emitter resistance. Resistors 207 may be controlled simultaneously with control of resistor 209 by the use of a common control shaft. The minimum common resistance in the emitter circuit is determined by the fixed resistor 211. If the resistance of resistor 211 is labelled $R_{211}$, the active resistance of resistor 209 is labelled $R_{209}$, the active resistance of resistor 207 is labelled $R_{207}$ and the emitter-base resistance of a transistor 203 is labelled $R_{203}$, than the smallest ratio between the amplitudes of the most positive signal $E_i$ and the adjacent signal $E_j$ that may be tolerated without indicating a reject is approximately:

$$\frac{R_{203}+R_{207}+R_{209}+R_{211}}{R_{209}+R_{211}} \qquad (18)$$

Only the transistor associated with the most positive input signal is permitted to conduct if the most positive signal exceeds the adjacent signal by an amount greater than the sensitivity of the system.

The output of the conducting transistor 203 is applied to an associated PNP transistor switch 213 which, in turn, provides current to operate a relay 215 associated with the largest input signal. A group of resistors 247 provide protection for transistors 203 and 213. A second group of resistors 219 provide a path for leakage current in the base circuits of transistors 213.

A reject circuit containing a transistor 221 and the reject relay 223 operates when the largest two or more applied signals are approximately equal. This condition causes two or more relays 215 to operate. Transistor 2 is ordinarily non-conducting due to the negative voltage at its base (which is equal to the supply voltage applied to a resistor 225 less the voltage drop across the resistor).

When two or more relays 215 are operated simultaneously, a sufficient current flows in resistor 225 to provide a voltage to the base of transistor 221 which is above cut-off valve and the transistor conducts, operating relay 223. Each relay has a set of contacts 227 which control the operation of the corresponding indicator 201. Thus, the maximum signal indicator 17 provides an indication of the identity of the specimen, or a reject indication if the specimen cannot be unequivocally identified.

The analog correlation technique using summing amplifiers can be replaced by a digital system. In this case, it has been found that the condition probabilities can be quantized with every little loss in system performance and simple digital circuits may be used. For example, if the probabilities are quantized to four levels, 2-bit binary calculations are sufficient, and quantizing to eight levels requires only 3-bit binary calculations.

A specimen identification system has been described which uses functions $n$th order generalized autocorrelation functions which represent selected $n$-tuples of points on the document. The $n$-tuples or features that are used as the basis of identification are selected by a method which provides a large data reduction while retaining stable and accurate specimen identification. The selected $n$-tuples are analyzed by a Bayes Rule decision procedure to provide an indication of the identity of the specimen. Tests of the invention on over 400 specimens (other than those used for sample patterns) have resulted in a zero error rate and a zero reject rate in identifying the ten digits. A larger machine using 75 n-tuples was tested on 1300 upper and lower case alphabetic specimens (other than those used for sample patterns) and yielded a zero error rate with an 0.3% reject rate and an 0.15% error rate of zero reject rate.

While the preferred embodiment described the use of $n$-tuples or presented by binary functions of elements of $n$th-order generalized autocorrelation functions, other functions of generalized autocorrelation functions can be used as the system parameters. The "and" gate 37 (FIGURE 3) can be replaced by majority organs which provide an output when a predetermined fraction $m/n$ of the applied inputs (corresponding to black points and white points on the document) are present. (An "and" gate can be considered to be a majority organ requiring all inputs $n/n$ to be present and an "or" gate can be considered to be a majority organ requiring one input $l/n$ to be present.) When the "and" gates 37 are replaced by generalized majority organs, each system parameter is a function of the presence or absence of a predetermined fraction of the points in an $n$-tuple. However, these parameters are, in themselves, direct functions of $n$th order generalized autocorrelation functions because a majority organ can be represented (and embodied) by and-or logic. For example, a five input $(a, b, c, d, e)$ majority organ which requires at least four inputs to be present can be represented by:

$$(a \cdot b \cdot c \cdot d) + (a \cdot b \cdot c \cdot e) + (a \cdot b \cdot d \cdot e)$$
$$+ (a \cdot c \cdot d \cdot e) + (b \cdot c \cdot d \cdot e) \qquad (19)$$

In this example, replacement of "and" gates 37 by simple and-or logic circuits to perform function (19) provides a system based on a function of fourth-order generalized autocorrelation functions, and the use of majority organs or other logic operators or generalized autocorrelation functions is considered to be an obvious extension of the preferred embodiment of the invention and within the scope of the inventions.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An apparatus for identifying a specimen located in a document area comprising, in combination:
   means for generating a multi-valued data representation of the document area, where each element of data corresponds to a predetermined location in the document and where the value of each element is determined by the relative intensity of the document at this location;
   means for generating a function of a generalized $n$th order autocorrelation function of the multi-valued representation, where $n$ is a positive integer, where each element of the generated function is a function of the existence in $n+1$ point combinations of data elements with predetermined data values, located throughout the document area, and where the generated function is dependent upon at least two values of data elements;
   and means for analyzing the generated function to provide an indication of the identity of the specimen.

2. The apparatus described in claim 1, wherein a non-linear function of a generalized $n$th order autocorrelation function is generated and analyzed.

3. An apparatus for identifying a specimen located in a document area comprising, in combination:
   means for generating a binary data representation of the document area, where each element of data corresponds to a predetermined location in the document and where the value of each element is determined by the relative intensity of the document at this location;
   means for generating a function of a generalized $n$th order autocorrelation function of the binary representation, where $n$ is a positive integer, where each element of the generated function is a function of the existence of $n+1$ point combinations of data elements with predetermined data values located throughout the document area, and where the generated function is dependent upon at least two values of data elements;
   and means for analyzing the generated function to provide an indication of the identity of the sepcimen.

4. The apparatus described in claim 3, wherein a non-linear function of a generalized $n$th order autocorrelation function is generated and analyzed.

5. An apparatus for identifying a specimen located in a document area comprising, in combination:
   means for generating a multi-valued data representation of the document area, where each element of data corresponds to a predetermined location in the document and where the value of each element is determined by the relative intensity of the document at this location;
   means for selecting a plurality of elements of a function of a generalized $n$th order autocorrelation function, where $n$ is a positive integer, where each selected element is a function of the existence of an $n+1$ point combination of data elements with predetermined data values, located throughout the document area, and where the generated function is dependent upon at least two values of data elements;
   and means for analyzing the selected elements to provide an indication of the identity of the specimen.

6. The apparatus described in claim 5, wherein a non-linear function of a generalized $n$th order autocorrelation function is generated and analyzed.

7. An apparatus for identifying a specimen located in a document area comprising, in combination:
   means for simultaneously generating a plurality of multi-valued time-varying data representations which, at a given time, represents at least a portion of the document area and which, over a period of time, represents substantially the entire document area, where each element of data corresponds to a predetermined location on the document relative to the location corresponding to each other element of data generated at the same time, and where the value of the generated data is determined by the relative intensity of the document at the corresponding location;
   a plurality of logic means, each independently and simultaneously responsive to a plurality of the data representations and each for generating a function of an element of a generalized autocorrelation function by developing an indication when a predetermined logic requirement is satisfied, where the logic requirement of at least one of the logic means is dependent upon the existence of a data representation that differs in value from the value of another data representation that is required by a logic means;
   and analyzing means responsive to indications from logic means, independent of their time of occurrence, for providing an indication of the identity of the specimen.

8. The apparatus described in claim 7, wherein the means for simultaneously generating a plurality of multi-valued, time-varying data representations comprises a shift register.

9. The apparatus described in claim 7, wherein the logic means comprise majority organs.

10. The apparatus described in claim 7, wherein the logic means comprise "and" gates.

11. The apparatus described in claim 7, wherein the logic means comprise majority organs coupled to means for storing functions of the indications generated by the majority organs.

12. The apparatus described in claim 7, wherein the logic means comprise "and" gates coupled to means for storing functions of the indication generated by the "and" gates.

13. The apparatus described in claim 12, wherein each of the storage means provides a first binary indication when the corresponding "and" gate generates an indication of a satisfied logic requirement at any time during the generation of the time-varying data representations, and provides a second binary indication when the corresponding "and" gate does not generate an indication of a satisfied logic requirement at any time during the generating and the time varying data representations.

14. The apparatus described in claim 7, wherein the analyzing means generates an indication of the identity of the specimen which is based on a function of a Bayes Rule decision procedure.

15. The apparatus described in claim 12, wherein the analyzing means generates an indication of the identity of the specimen which is based on a function of a Bayes Rule decision procedure.

16. The apparatus described in claim 7, wherein a plurality of binary, time-varying data representations are generated.

17. The apparatus described in claim 8, wherein a plurality of binary, time-varying data representations are generated.

18. An apparatus for identifying a specimen located on a document area comprising, in combination:
   means for serially scanning the document to sequentially generate binary signals that are indicative of the intensity of the document at a plurality of locations;
   a shift register responsive to the binary signals and to interspersed shift signals for simultaneously presenting a plurality of the applied binary signals, and for presenting the complements of a plurality of the applied binary signals;
   a logic circuit comprising a plurality of "and" gates, each responsive to a plurality of shift register output presentations, each for generating a function of an element of a generalized autocorrelation function by developing a signal when all of the applied functions assume the same binary value, where at least one "and" gate is responsive to at least one complemented signal from the shift register and where at least one "and" gate is responsive to at least one uncomplemented signal from the shift register;

a plurality of bistable devices, each responsive to the output of an "and" gate and each for providing a first binary indication when the corresponding "and" gate generates a signal and a second binary indication when the corresponding "and" gate does not generate a signal;

and analyzing means responsive to the indications provided by the bistable devices after a plurality of scanned binary signals are shifted a plurality of times in the shift register, for providing an indication of the identity of the specimen.

19. The apparatus described in claim 18, wherein the "and" gates are directly responsive to shift register output presentations for generating a signal when all of the applied presentations assume the same binary value.

20. The apparatus described in claim 18, wherein the analyzing means generates an indication of the identity of the specimen which is based on a function of a Bayes Rule decision procedure.

21. The apparatus described in claim 18, wherein the analyzing means comprises a resistance network for generating an indication of the identity of the specimen which is based on a function of a Bayes Rule decision procedure.

22. The apparatus described in claim 18, wherein the analyzing means comprises a resistance network and summing amplifiers for generating an indication of the identity of the specimen which is based on a function of a Bayes Rule decision procedure.

23. The apparatus described in claim 5 wherein the selection of elements is based on a statistical measure.

24. The apparatus described in claim 6, wherein the selection of elements is based on a statistical measure.

25. The apparatus described in claim 5 wherein each state $\bar{x}$ of the selected elements provides a conditional probability distribution $P\{c_i|\bar{x}\}$ that is peaked for a sampling of input patterns that corresponds to each reference pattern $c_i$.

26. The apparatus described in claim 25, wherein the characteristics of the probability distribution are evaluated according to:

$$\log_2 m + \sum_{\bar{x}} P\{\bar{x}\} \sum_{i=1}^{m} P\{c_i|\bar{x}\} \log_2 P\{c_i|\bar{x}\}$$

where $P\{\bar{x}\}$ is the probability of the parameter state $\bar{x}$ and the first sum is taken over all states of the set of selected elements.

27. An apparatus of classifying specimens among reference patterns $c_1, c_2, \ldots c_m$ comprising in combination:

means for generating a selected plurality of elements $x_i$ of a function of a generalized $n$th-order autocorrelation function of the specimen, where the selection provides a peaked conditional probability distribution $P\{c_i|\bar{x}\}$ for a sampling of input patterns that correspond to $c_i$;

and means for analyzing the selected elements to provide an indication of the identity of the specimen.

28. The apparatus described in claim 21, wherein the characteristics of the probability distribution are evaluated according to:

$$\log_2 m + \sum_{\bar{x}} P\{\bar{x}\} \sum_{i=1}^{m} P\{c_i|\bar{x}\} \log_2 P\{c_i|\bar{x}\}$$

where $P\{\bar{x}\}$ is the probability of the parameter state $\bar{x}$ and the first sum is taken over all states of the set of selected elements.

References Cited by the Examiner

UNITED STATES PATENTS 2,978,675  4/61  Highleyman ___________ 340—146.3

OTHER REFERENCES

C.K. Chow: "An Optimum Character Recognition System Using Decision Functions," IRE Trans. on Electronic Computers, pp. 247–254, December 1957.

"Stochastic Model for the Browning-Bledsoe Pattern Recognition Scheme" by G. P. Steck, IRE Trans., vol. EC–11 pp. 274–282, April 1962.

"Experiment in Adaptive Pattern Recognition" by J. S. Bryan, IEEE Trans., vol. MIL–7, pp. 174–179, April–July 1963.

MALCOLM A. MORRISON, *Primary Examiner.*